United States Patent [19]

Mierswa et al.

[11] Patent Number: 4,800,063
[45] Date of Patent: Jan. 24, 1989

[54] PROCESS AND APPARATUS FOR DECONTAMINATING PLANT PARTS CONTAMINATED WITH RADIOACTIVE MATERIAL

[75] Inventors: Christian Mierswa, Binzen; Friedrich Schmutz, Weil am Rhein, both of Fed. Rep. of Germany

[73] Assignee: Ernst Schmutz GmbH., Weil an Rhein, Fed. Rep. of Germany

[21] Appl. No.: 694,978

[22] Filed: Jan. 25, 1985

[30] Foreign Application Priority Data

Jan. 26, 1984 [DE] Fed. Rep. of Germany ....... 3402702

[51] Int. Cl.$^4$ .............................................. B24C 1/00
[52] U.S. Cl. .................................. 376/316; 376/310; 51/321; 51/425
[58] Field of Search ............... 376/308, 309, 310, 316; 51/321, 424, 425

[56] References Cited

U.S. PATENT DOCUMENTS 3,895,465 7/1975 Korn et al. .................... 376/310 X

FOREIGN PATENT DOCUMENTS 138998 8/1984 Japan ................................ 376/310

OTHER PUBLICATIONS

Osterhout, Marilyn M., ed., "Decontamination and Decommissioning of Nuclear Facilities" (New York; Plenum Press), 1980, pp. 38, 39, 43.

Primary Examiner—John F. Terapane
Assistant Examiner—John S. Maples
Attorney, Agent, or Firm—Fleit, Jacobson, Cohn & Price

[57] ABSTRACT

A process and apparatus for decontaminating parts of nuclear power plants which are contaminated with radioactive material, wherein surface layers are removed from the parts. The parts to be decontaminated are treated with a jet of pressurized water which contains a granular abrasive and which may contain admixed air. The mixed effluent consisting of water, abrasive and detached particles is separated into an aqueous phase and a sludge phase, the sludge phase is dried, and the resulting dry material is separated into abrasive and particles smaller in diameter than the abrasive. The purified abrasive is recycled to the water for forming the jet of water under pressure, and the separated particles are made available for safe disposal.

8 Claims, 1 Drawing Sheet

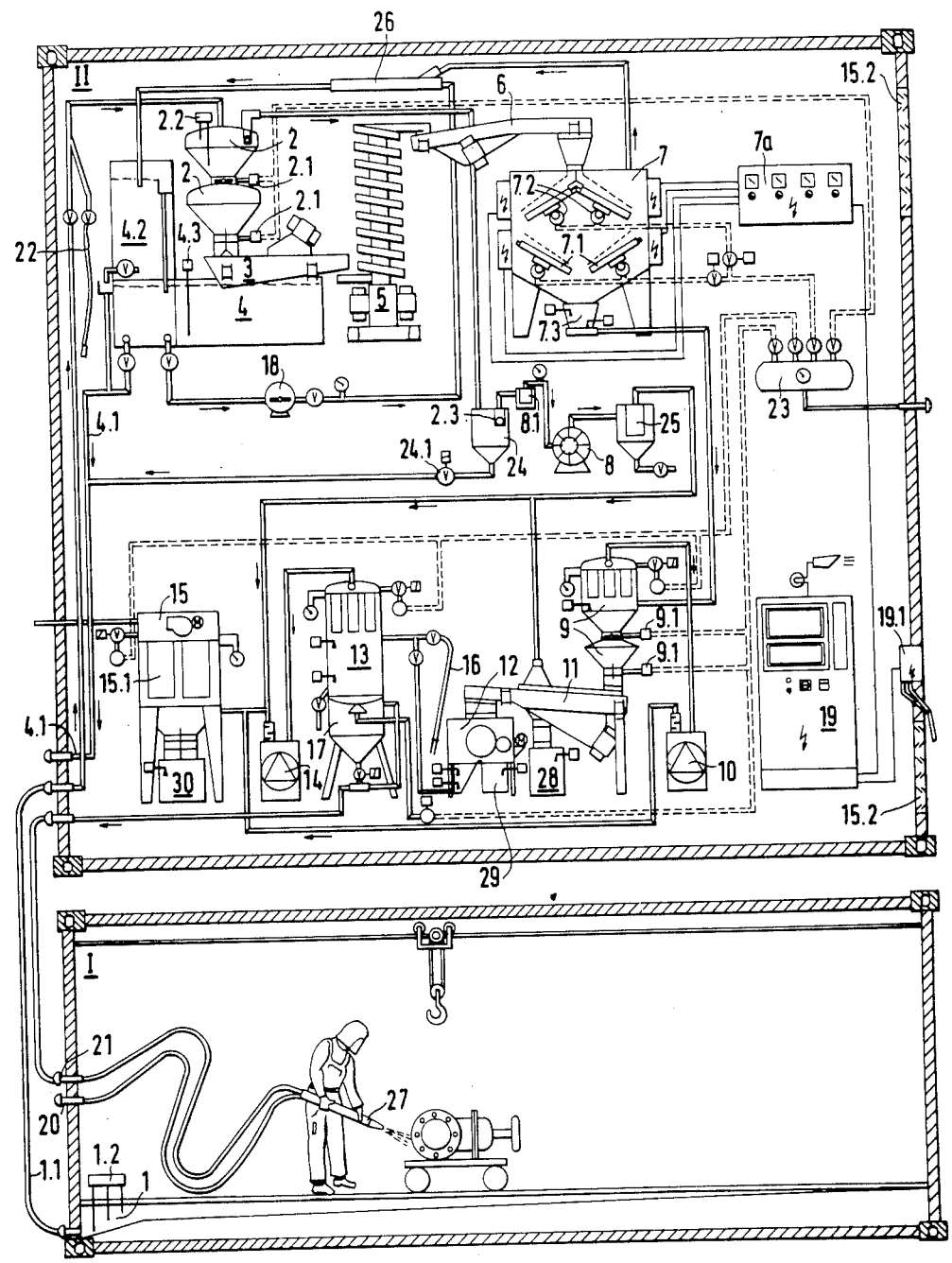

PROCESS AND APPARATUS FOR DECONTAMINATING PLANT PARTS CONTAMINATED WITH RADIOACTIVE MATERIAL

BACKGROUND OF THE INVENTION

1. Field of the Invention

This invention relates to a process of decontaminating parts of nuclear power plants which are contaminated with radioactive material, wherein surface layers are removed from said parts.

2. Description of the Prior Art

All parts of a nuclear power plant or of other plants for nuclear technology which have been contacted by radioactive materials must be decontaminated after the parts have been removed from the plant and before they can be dumped or can be reused, e.g., as scrap. Otherwise all such parts are to be disposed of in final dumps for radioactive wastes but that practice should be avoided owing to the high costs involved. At the present time the disposal of a 100-liter barrel which contains radioactive wastes costs about DM 5000. For this reason the quantity of radioactive wastes to be disposed of must be minimized.

It is known that plant parts which are contaminated with radioactive materials and have been removed from the plant can be cleaned with chemicals and water. But that process is expensive because the water which contains admixed chemicals and the solids which are formed must be entirely disposed of. Besides, the decontamination with the aid of chemicals and water cannot be effected on the power plant site but must be effected in factorylike plants, to which the parts which are to be disposed of and to be contaminated must be transported under safe conditions so that high costs for road transportation are added to the expensive decontamination process.

It is also known that parts which are contaminated with radioactive materials can be mechanically cleaned, e.g., by abrasion with grinding discs or the like. That process involves high labor costs and the persons who carry out said process are exposed to radioactivity.

SUMMARY OF THE INVENTION

It is an object of the invention to provide for the decontamination of plant parts contaminated with radioactive materials a process which can be carried out in a simple manner and at reasonable costs.

This object is accomplished in accordance with the invention in that the parts to be decontaminated are treated with a jet of pressurized water which contains a granular abrasive and which may contain admixed air, the mixed effluent consisting of water, abrasive and detached particles is separated into an aqueous phase and a sludge phase, the sludge phase is dried, the resulting dry material is separated into abrasive and particles smaller in diameter than the abrasive, the purified abrasive is recycled to the water for forming the jet of water under pressure, and the separated particles are made available for safe disposal. The removal of surface layers by means of an abrasive which is entrained in a jet of pressurized water is known per se but that process has been used only rarely for the decontamination of plant parts which are contaminated with radioactive materials because a mixture of detached particles and abrasive becomes available at a high rate and must be safely disposed of at high cost as slightly radioactive waste. About 500 kg of such waste become available per hour and their safe disposal presently costs about DM 10,000.

In accordance with the invention the plant parts which are contaminated with radioactive materials are decontaminated by the jetting process, which is known per se and can be carried out in an economical manner because the abrasive can be recovered and purified and can then be reused. The jet is formed by entirely desalted water, which can safely be disposed of without difficulty because it can be evaporated.

If the water vapor formed as the sludge phase is dried is sufficiently pure, it may be permitted to escape into the atmosphere. Alternatively, it may be condensed and supplied to the aqueous phase, which is purified by evaporation in special evaporating plants and may subsequently be condensed, if desired.

Before the water-abrasive-particle mixture is separated into two phases, the coarse-grained abrasive may be separated. The mixture may be separated into different phases by sedimentation.

The solids which are left when the sludge phase has been dried may be separated by sieving into abrasive, possibly into abrasive fractions having different particle sizes, and into particles which have been detached from the surfaces of the plant parts by the abrasive and are smaller than the abrasive particles and must be safely disposed of. That separation can be relatively simply effected because the particles which have been detached from the surfaces of the plant parts are smaller than the abrasive particles. It will be understood that any abrasive particles which have been destroyed will enter the fraction which is to be safely disposed of.

In an alternative, only the coarse-grained particles which have been recovered are separated into a reusable abrasive and into a mixture of destroyed abrasive particles and particles which have been detached from the surfaces of the plant parts, and said mixture and the sludge which contains detached particles which are smaller than the abrasive particles are safley disposed of.

Apparatus for carrying out the process according to the invention comprises two enclosed chambers, which are separated from each other and one of which contains a grate as a working platform and a sludge-collecting basin, whereas the other chamber contains the equipment for separating the sludge into water and solids. The chambers are provided with the required ports and are suitably enclosed in an alloy steel housing. They may be made in the dimensions of ISO Standard Containers so that they can easily be transported to different locations of use.

The containers are usually placed near nuclear power plants which contain waste that is to be disposed of so that the sewage can be supplied to the sewage system of the plant.

The abrasive may consist of particles of corundum, glass or alloy steel and may preferably have particle sizes from 0.6 to 1.2 mm.

BRIEF DESCRIPTION OF THE DRAWING

The single FIGURE of the drawing is a diagrammatic representation of a decontaminating container I, which contains a working chamber, and a recycling container II, which contains the decontaminating equipment.

DETAILED DESCRIPTION OF THE PREFERRED EMBODIMENT

The containers I, II enclose respective chambers and have walls which consist of alloy steel and are secured to a sectional steel frame consisting of bottom longitudinal and transverse members, door posts at the corners, end corner posts and upper longitudinal and transverse members. These structural steel members consist of special cold-rolled steel sections. Each container is provided with a door, not shown, and with the required air intake and discharge ports, as well with outwardly directed ports for connection to .pipelines. All seam welds have been ground smooth and have been machined and polished so that they have no surface pores.

An illustrative embodiment of the invention will now be described with reference to the drawing.

The decontaminating container I contains the working chamber. It is provided with a platform grate above a sludge collector 1, which receives the water-abrasive-detached particle mixture. The decontaminating container I is provided with a port 20 for receiving high-pressure water, a port 21 for receiving abrasive and a port, not shown, for receiving compressed air. The sludge collector 1 is also provided with a port that is connected to the hose line 1.1. The hoses connected to the high-pressure water port 20 and the abrasive port 21 are connected to a jet nozzle 27 of usual type.

The sludge-water mixture collected in the sludge collector 1 consists of the water insoluble abrasive (corundum, granular alloy steel, wire particles), particles abraded by the abrasive (residual paint, metal particles etc.), and water and is sucked into the recycling container II through a flexible hose line 1.1, which connects the two containers I and II. The transfer of the mixture is automatically initiated and interrupted under the control of a level indicator 1.2 in dependence on minimum, maximum and limiting levels of the mixture in the sludge collector 1. Before the water-abrasive-particle mixture is separated into two phases, the coarse-grained abrasive may be separated. The mixture may be separated into different phases by sedimentation.

In the recycling container II the sludge-abrasive-water mixture is first supplied to two pear-shaped vacuum vessels 2, which contain two chambers each and are controlled by two rotary valves 2.1, which are electropneumatically actuated under clock control. The mixture is then discharged through a lock chamber to a vibratory dewatering sieving plant 3 disposed under the pear-shaped vessels 2 and separates each of the two streams into solids and liquid phases. Liquid is drained into the water-collecting tub 4 disposed under the sieving apparatus 3. The mixed solids are transferred to the outlet of the vibratory dewatering sieving plant 3. In order to prevent an uncontrolled overflow of liquid from the vacuum vessels 2 to the vacuum pump 8, electric level detectors 2.2 are provided as well as two mechanical liquid separators and associated float switches 2.3 and 2.4.

The liquid separator 24 is automatically emptied through a discharge valve 24.1 Residues can be sucked from the recycling container II by means of a manually handled suction apparatus 22. The vacuum pump 8 is protected by a preceding filter 8.1 from an ingress of dust. An oil mist separator 25 prevents an ingress of oil mist into the succeeding dust-collecting system 15.

CIRCULATING SYSTEM FOR SOLIDS TO BE DISPOSED OF AND FOR ABRASIVE TO BE RECOVERED

The mixed solids recovered by the strong preliminary dewatering on the vibratory dewatering sieving plant 3 are trasferred on a vibratory helical conveyor 5 to a vibratory feeding trough 6 and are discharged by the latter to the dryer 7. That dryer 7 is an electrically heated cascade dryer and comprises four elastically mounted, rotatable heating plates 7.1 of aluminum, which are vibrated by ball vibrators 7.2, which are operated under a timing control. The temperature of each heating plate 7.1 of aluminum is separately controlled by a switching and control cabinet 7a in dependence on the load. The mixed solids which trickle down are pneumatically sucked by a vacuum pump 10 from the collecting funnel 7.3 into the solids collector of the suction conveyor 9 and are continuously supplied to a vibratory sieving plant 11 through a two-chamber lock system provided with pneumatically actuated rotary valves 9.1. On the vibratory sieving plant 11 the mixed solids are mechanically separated into undersize particles, which can not be reused, and reusable particles. The undersize particles are collected in the undersize particle collector 28. The reusable abrasive is passed through a magnetic separator 12 for a separation into magnetic and nonmagnetic constituents. The magnetic residues are collected in the magnetic material collector 29. The nonmagnetic reusable abrasive is conveyed by means of the vacuum pump 14 into the collecting container of the suction conveyor 13. That collecting container is so dimensioned that it is adapted to contain a buffer supply of the abrasive to be entrained in the jet. From the collecting container, the abrasive is automatically transferred to the abrasive supply container 17 disposed under the collecting container. That transfer is automatically effected when the operator in the decontaminating container I has interrupted the jetting operation. Make-up abrasive is manually supplied to the collecting container of the suction conveyor 13 by means of a make-up suction apparatus 16.

CIRCULATING SYSTEM FOR COLLECTING MATERIALS TO BE SAFELY DISPOSED OF AND FOR DUST COLLECTION

In order to prevent a raising of dust at the points where abrasive is transferred, all regions of the recycling container II where dust might be raised (particularly the vibratory sieving plant 11), inclusive of the vacuum generators 8, 10, 14, are connected to the dust collector 15 by a central exhaust pipe system. The exhaust air is filtered by large cartridge filters 15.1, which are continually cleaned in operation by compressed air pulses. The dust which has been separated is collected in a dust collecting container 30 disposed under the dust collector 15. Fresh air enters through four strip grilles 15.2 provided in the charging doors at one end of the recycling container II.

CIRCULATING SYSTEM FOR WATER TO BE DISPOSED OF

Before the water collected in the water-collecting tub 4 is delivered to the sewage line 4.1 of the nuclear power plant, said water is used for two purposes. The water is first forced by a high-pressure pump 18 into a water jet fan 26 and then flows as a vapor-water mixture into the upper water reservoir 4.2 and from the latter flows over an overflow into the water-collecting tub 4 disposed underneath. The large quantity of water in both containers will ensure that the steam sucked from the dryer 7 will not result in an excessive temperature rise. The moderately heated water flows from the overflow of the water-collecting tub 4 through the sewage line 4.1 back into the nuclear power plant. A dry running of the high-pressure water pump 18 is prevented by a minimum level detector 4.3. If the water vapor formed as the sludge phase is dried is sufficiently pure, it may be permitted to escape into the atmosphere. Alternatively, it may be condensed and supplied to the aqueous phase, which is purified by evaporation in special evaporating plants and may subsequently be condensed, if desired.

COMPRESSED AIR SUPPLY

Compressed air is supplied from an externally disposed container 23 for storing and distributing compressed air, which is supplied from said container to the electropneumatic actuators, ball vibrators 7.2, filter cleaners etc. disposed in the recycling container 2.

SWITCHING, CONTROL AND MONITORING EQUIPMENT

An electric switching and control cabinet 19 is provided for controlling the automatic transfer of material between the decontaminating container I and recycling container II and accommodates all switching, control and monitoring equipment required for a fully automatic operation of the plant. Electric power is supplied via a main connector 19.1. The temperature and power of the dryer 7 are controlled by means of the control cabinet 7a.

We claim:

1. A process for decontaminating parts of nuclear power plants which are contaminated with radioactive material, wherein surface layers are removed from said parts, said process comprising: treating the parts to be decontaminated with a jet of pressurized water which contains a granular water insoluble abrasive to form a mixed effluent, separating the mixed effluent of water, abrasive and detached particles into an aqueous phase and a sludge phase, drying the sludge phase to provide a substantially dry residue, separating the resulting dry residue into larger particles larger than a predetermined size and particles smaller in size, separating the larger particles into non-abrasive materials and reusable abrasive, recycling the reusable abrasive to the pressurized water for forming the part treating jet of water under pressure, and disposing of the remaining separated particles and non-abrasive materials.

2. A process according to claim 1, including the step of evaporating the aqueous phase.

3. A process according to claim 1, including the step of discharging to a sewage line the water vapor formed by the drying of the sludge phase.

4. A process according to claim 1, including the step of separating the solids which are left when the sludge phase has been dried by sieving into abrasive fractions having different particle sizes, and particles which have been detected from the surfaces of the plant parts by the abrasive and are smaller than the abrasive particles, and disposing of the detached particles.

5. A process according to claim 1, wherein the separation of the reusable abrasive from the larger particles is performed by passing the larger particles through a magnetic separator to separate them into magnetic and non-magnetic constituents.

6. A process according to claim 1, including the step of condensing and adding to the aqueous phase the water vapor formed by the drying of the sludge phase.

7. A process according to claim 1, including the step of initially separating coarse-grained abrasive from the mixture of water, abrasive and detached particles before said mixture is further separated.

8. A process according to claim 7, wherein said initial separating step is performed by sedimentation.

* * * * *